May 22, 1928.
K. HICKOX
1,670,538
VAPOR INHALING AND BATH APPARATUS
Filed April 9, 1925   2 Sheets-Sheet 1
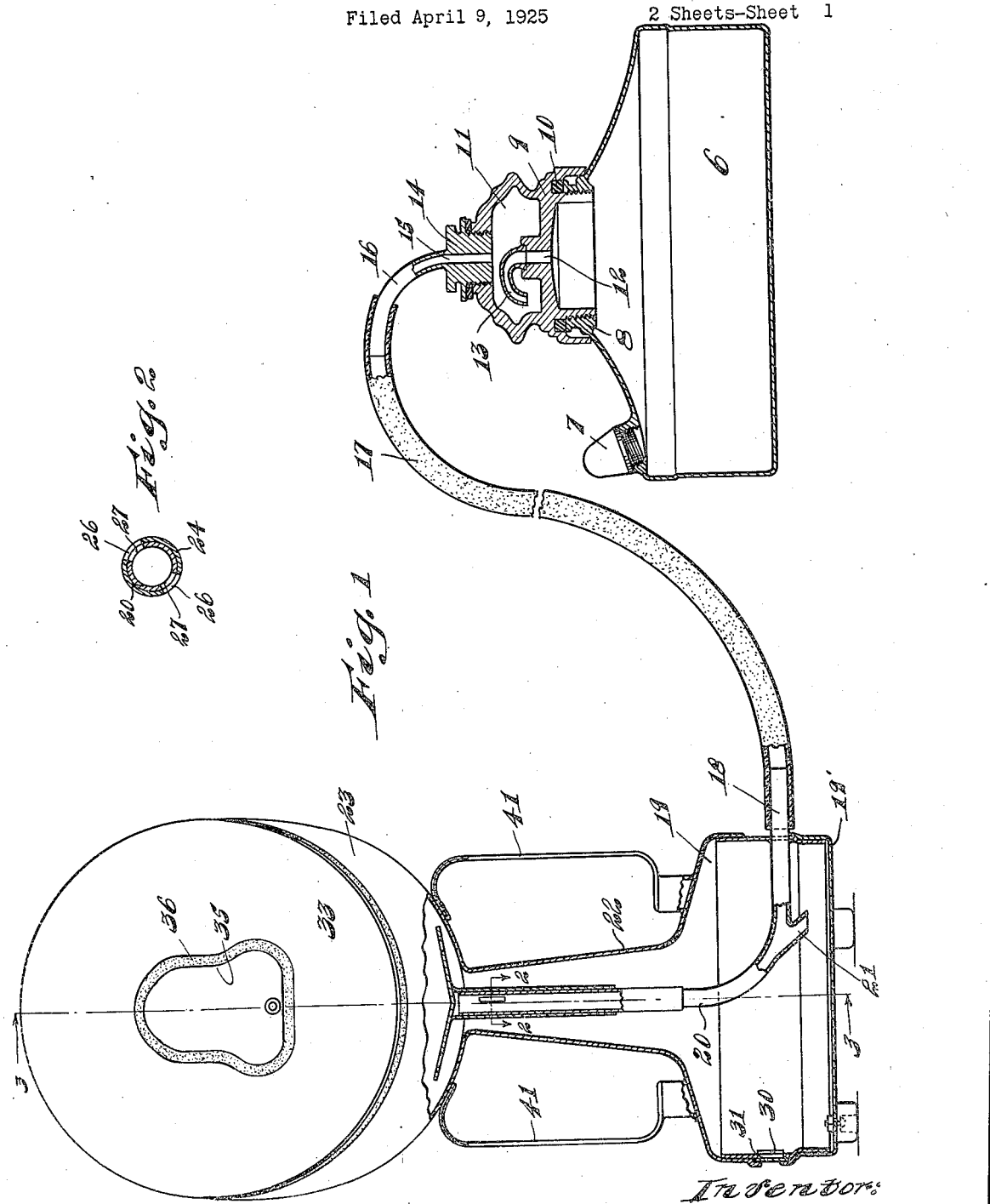
Witnesses:
C. E. Wessels.
B. G. Richards
Inventor:
Kasson Hickox,
By Joshua R H Polk
his Attorney.

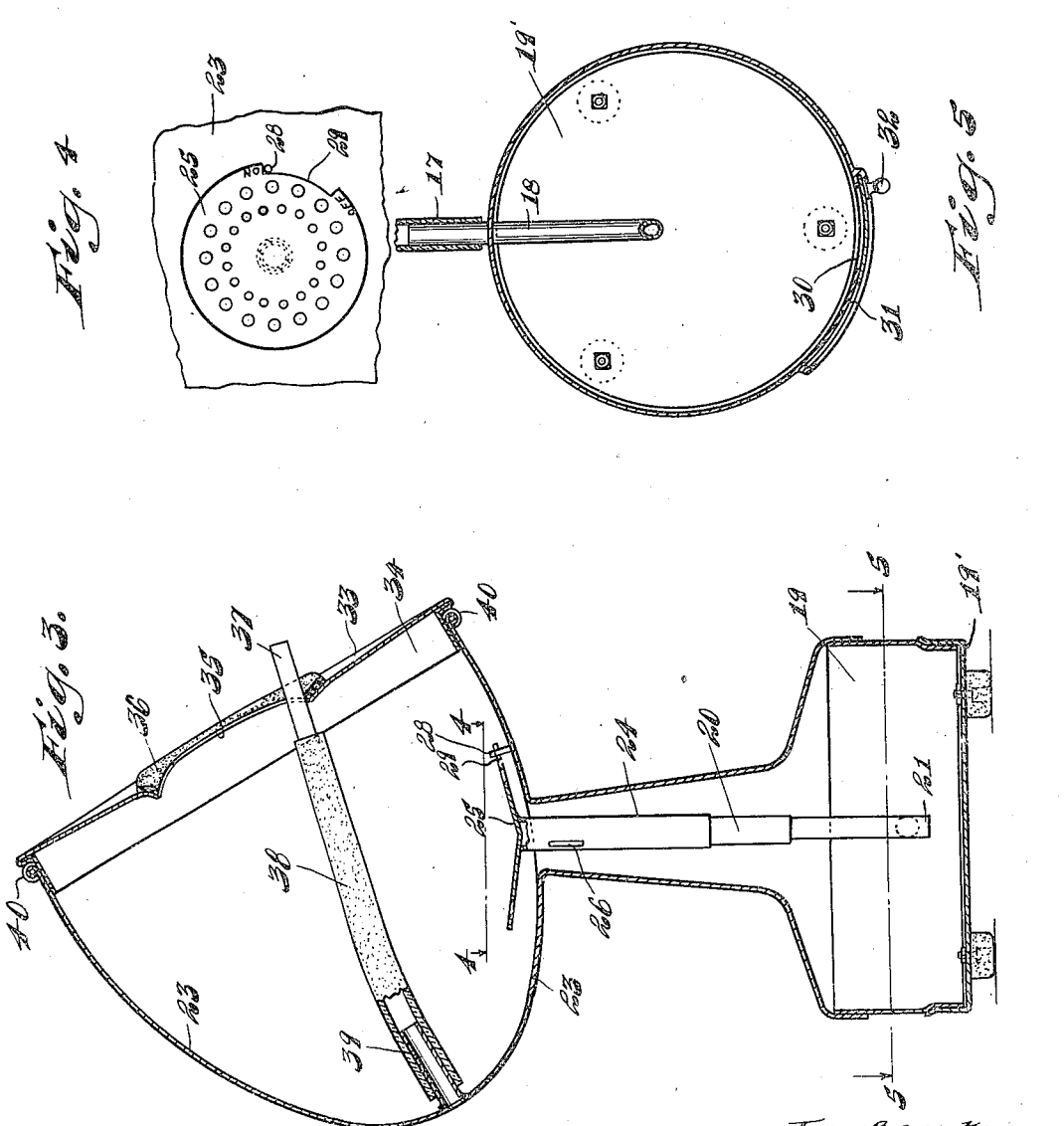

Patented May 22, 1928.

1,670,538

UNITED STATES PATENT OFFICE.

KASSON HICKOX, OF CHICAGO, ILLINOIS.

VAPOR INHALING AND BATH APPARATUS.

Application filed April 9, 1925. Serial No. 21,786.

My invention relates to improvements in vapor inhaling and bath apparatus and has for its object the provision of an improved construction of this character whereby medicated vapors may be inhaled or applied to the face or other parts of the body which is of simple construction and efficient in operation.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical transverse section, partly in elevation;

Fig. 2 is an enlarged section taken on line 2—2 of Fig. 1;

Fig. 3 is a vertical section taken on line 3—3 of Fig. 1;

Fig. 4 is a view taken on the line 4—4 of Fig. 3; and

Fig. 5 is a section taken on the line 5—5 of Fig. 3.

The preferred form of construction as illustrated in the drawings comprises a boiler 6 adapted to be placed on a stove or other means for heating the same, and provided with a movable filling plug 7 in its top. The boiler 6 is provided with a threaded opening extending through the boss 8 in the top, and a casing 9 is provided with a threaded stem fitting into the boss 8 and with an outer flange fitting over said boss as shown. A gasket 10 is arranged as indicated to effect a tight seal. A medicinal chamber 11 is formed in the casing 9 and provided with a central passageway 12 leading upwardly to connect with a bent tube 13 which opens downwardly near the bottom of the chamber 11. A removable plug 14 is threaded in the top of the casing 9 and provided with a central passageway 15 connecting with a bent tube 16 to which a rubber tube 17 is attached.

By this arrangement, it will be observed that medicinal liquids may be readily placed in the chamber 11 and steam from the boiler 6 passed over or therethrough thus vaporizing said liquid and forming a medicinal vapor passing outwardly through the rubber tube 17.

The rubber tube 17 is connected with the nipple 18, extending through the side of the mixing chamber 19, said nipple communicating with a vertical central tube 20 in said mixing chamber. The mixing chamber 19 is provided with a ready removable bottom 19' for cleaning purposes. The tube 20 is provided at its lower end with a drip opening or tube 21 and the mixing chamber is provided with an upwardly extending central neck 22 on the top of which a globular chamber 23 is mounted. A sleeve 24 is rotatably mounted on the upward end of the tube 20 and carries at its upper end a conical spreader plate or disk 25 which is perforated as shown thus serving to close the upper end of tube 20. The sleeve 24 and tube 20 are provided with cooperating ports 26 and 27 which may be opened or closed by rotating the plate 25. The movements of plate 25 are controlled by a pin 28, engaging a notch 29 and whereby the discharge of medicated vapor from the upper end of the tube 20 may be regulated as desired.

The mixing chamber 19 is provided at one side with an air opening 30 and a slidable closure or valve 31 operable by a handle 32 and whereby a regulated amount of air may be admitted to the mixing chamber 19. By this arrangement it will be observed that the medicated vapor entering the mixing chamber 19 will be thoroughly mixed with air in any desired proportions and passed upwardly into the vapor chamber 23.

The vapor chamber 23 is provided with an inclined open side having a removable cover 33 provided with a lip or flange 34 fitting loosely within the open side of said chamber as shown and whereby said cover may be readily removed when desired, said cover being supported in an inclined position when in place.

The cover 34 is provided with a central opening 35 adapted and arranged to fit around the face and nostrils of the user and rubber pad 36 is arranged around the edges of said opening and whereby the mouth and nostrils may be placed in communication with the interior of the vapor chamber 23 and vapors therein inhaled as desired.

A glass tube 37 is provided with a rubber tube 38 which may be attached to a nipple 39 extending through the rear of the chamber 23 and whereby air may be drawn through said chamber when desired. The edges of the open side of chamber 23 are provided with rubber pads 40 for contact with the face of other parts of the body of user. By this arrangement it will be observed that the cover 33 may be removed when desired and medicated vapors for external use only applied to the skin as desired. Where it is desired to apply such vapors to the face the air tube is utilized to permit breathing of fresh air during the treatment as desired.

Suitable handles 41 are extended between the mixing chamber 19 and the vapor chamber 23 serving to facilitate use of the vapor chamber and also to strengthen the construction.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the class described comprising a mixing chamber; a vapor chamber mounted on top of said mixing chamber and in open communication therewith; a tube leading laterally through one side of said mixing chamber and extended upwardly towards said vapor chamber; means for supplying vapor to said tube; a spreader mounted on top of said tube, said spreader being provided with a sleeve rotatably encompassing said tube; cooperating ports in said sleeve and tube; and means for admitting air to said chamber, substantially as described.

2. A device of the class described comprising a mixing chamber; a vapor chamber mounted on top of said mixing chamber and in open communication therewith; said vapor chamber being provided with an inclined open side; a removable cover for said inclined side, said cover being provided with a central opening; a tube leading laterally through one side of said mixing chamber and extending upwardly towards said vapor chamber, there being a drip opening in said tube; a spreader mounted on top of said tube, said spreader being provided with a sleeve rotatably encompassing said tube; cooperating ports in said sleeve and tube; and adjustable means for admitting air through a side of said mixing chamber, substantially as described.

In testimony whereof I have signed my name to this specification.

KASSON HICKOX.